(12) United States Patent
Kim et al.

(10) Patent No.: US 10,151,949 B2
(45) Date of Patent: Dec. 11, 2018

(54) BACKLIGHT UNIT COMPRISING BENT CURVE-SHAPED BACK PLATE, AND CURVED DISPLAY DEVICE USING THE SAME

(71) Applicant: TOVIS CO., LTD., Incheon (KR)

(72) Inventors: Hwan Jin Kim, Gwangmyeong-si (KR); Gi Yun Eom, Incheon (KR)

(73) Assignee: TOVIS CO., LTD., Incheon (KR)

( * ) Notice: Subject to any disclaimer, the term of this patent is extended or adjusted under 35 U.S.C. 154(b) by 0 days.

(21) Appl. No.: 15/536,664

(22) PCT Filed: Dec. 19, 2014

(86) PCT No.: PCT/KR2014/012608
§ 371 (c)(1),
(2) Date: Jun. 16, 2017

(87) PCT Pub. No.: WO2016/098933
PCT Pub. Date: Jun. 23, 2016

(65) Prior Publication Data
US 2018/0004039 A1    Jan. 4, 2018

(30) Foreign Application Priority Data
Dec. 17, 2014  (KR) .................. 10-2014-0182364

(51) Int. Cl.
*G02F 1/1335* (2006.01)
*F21V 8/00* (2006.01)
*G02F 1/1333* (2006.01)

(52) U.S. Cl.
CPC ..... *G02F 1/133603* (2013.01); *G02B 6/0025* (2013.01); *G02F 1/133305* (2013.01);
(Continued)

(58) Field of Classification Search
CPC ......... G02F 1/133603; G02F 1/133305; G02F 1/133615; G02B 6/0025; G02B 6/0055
See application file for complete search history.

(56) References Cited

U.S. PATENT DOCUMENTS 9,483,964 B2 *  11/2016  Choi .................... G09F 9/30
9,857,614 B2 *   1/2018  Kim ................ G02F 1/133308
(Continued)

FOREIGN PATENT DOCUMENTS

CN     103901655     † 7/2014
JP     2010-002486 A   1/2010
(Continued)

OTHER PUBLICATIONS

International Search Report for PCT/KR2014/012608 dated Aug. 20, 2015 from Korean Intellectual Property Office.

*Primary Examiner* — Kevin Quarterman
(74) *Attorney, Agent, or Firm* — Revolution IP, PLLC

(57) ABSTRACT

A backlight unit of a curved display device to irradiate a curved display panel with light comprises: a light source configured to emit light to the display panel; and a back plate including a plurality of planar sections, each having a predetermined width, arranged in a circumferential direction of the display panel on a concentric circle, the center point of which coincides with the center point of a virtual circle defined by the curved display panel, the planar sections of the back plate being bent relative to each other into a curved form such that the light source is installed to the respective bent sections of the bent curved back plate.

11 Claims, 15 Drawing Sheets

(52) U.S. Cl.
    CPC .. *G02F 1/133608* (2013.01); *G02F 1/133615*
            (2013.01); *G02B 6/0055* (2013.01); *G02F*
                                    *2001/133342* (2013.01)

(56) References Cited

U.S. PATENT DOCUMENTS

| | | | |
|---|---|---|---|
| 2007/0146569 A1* | 6/2007 | Nouchi | G02B 6/0088 |
| | | | 349/58 |
| 2013/0321740 A1 | 12/2013 | An et al. | |
| 2014/0009914 A1 | 1/2014 | Cho et al. | |
| 2014/0111736 A1* | 4/2014 | An | G02F 1/133305 |
| | | | 349/58 |
| 2014/0354914 A1* | 12/2014 | Lee | G02F 1/133608 |
| | | | 349/58 |

FOREIGN PATENT DOCUMENTS

| | | | |
|---|---|---|---|
| JP | 2010-097736 | † | 4/2010 |
| JP | 2013-016406 | † | 1/2013 |
| JP | 2013-242525 A | | 12/2013 |
| JP | 2014-236218 | † | 12/2014 |
| KR | 10-2009-0052594 A | | 5/2009 |
| KR | 10-2011-0025493 A | | 3/2011 |
| KR | 10-2011-0054459 | † | 5/2011 |
| KR | 10-2013-0020302 A | | 2/2013 |
| KR | 10-1319543 | † | 10/2013 |
| KR | 10-2014-0007202 A | | 1/2014 |
| KR | 10-2014-0052239 | † | 5/2014 |
| KR | 10-2014-0052446 | † | 5/2014 |
| KR | 10-2014-0052446 A | | 5/2014 |
| KR | 10-2014-0065577 A | | 5/2014 |

\* cited by examiner
† cited by third party

[Fig. 1]
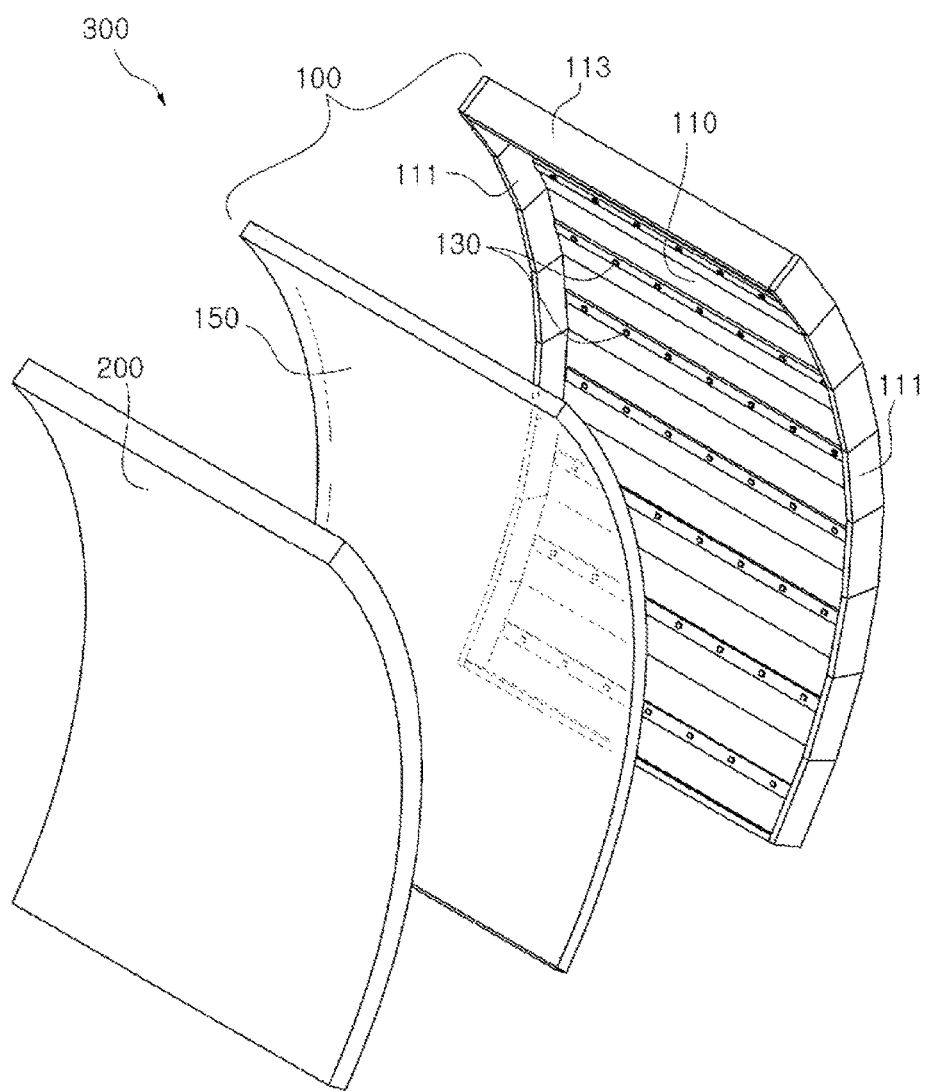

[Fig. 2]
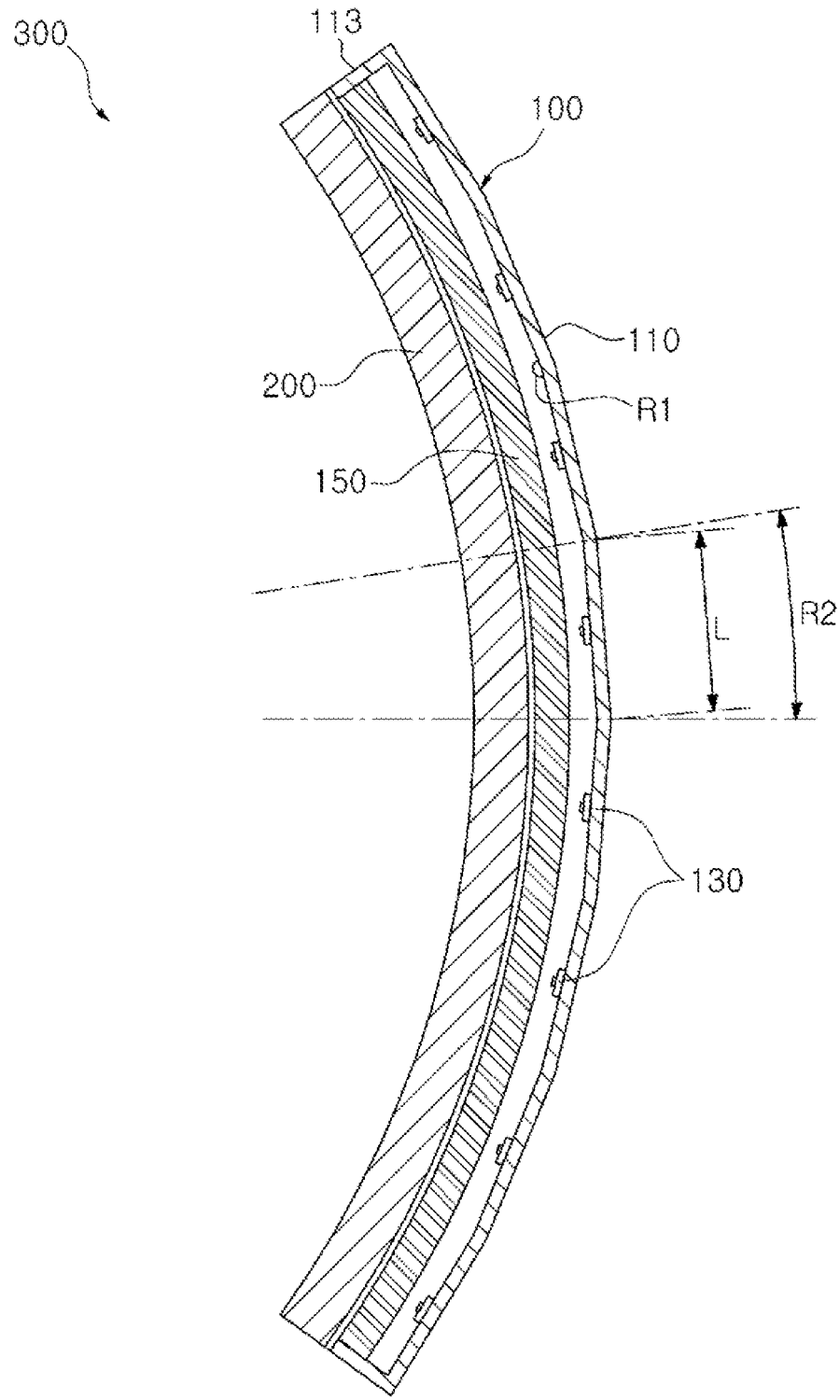

[Fig. 3]
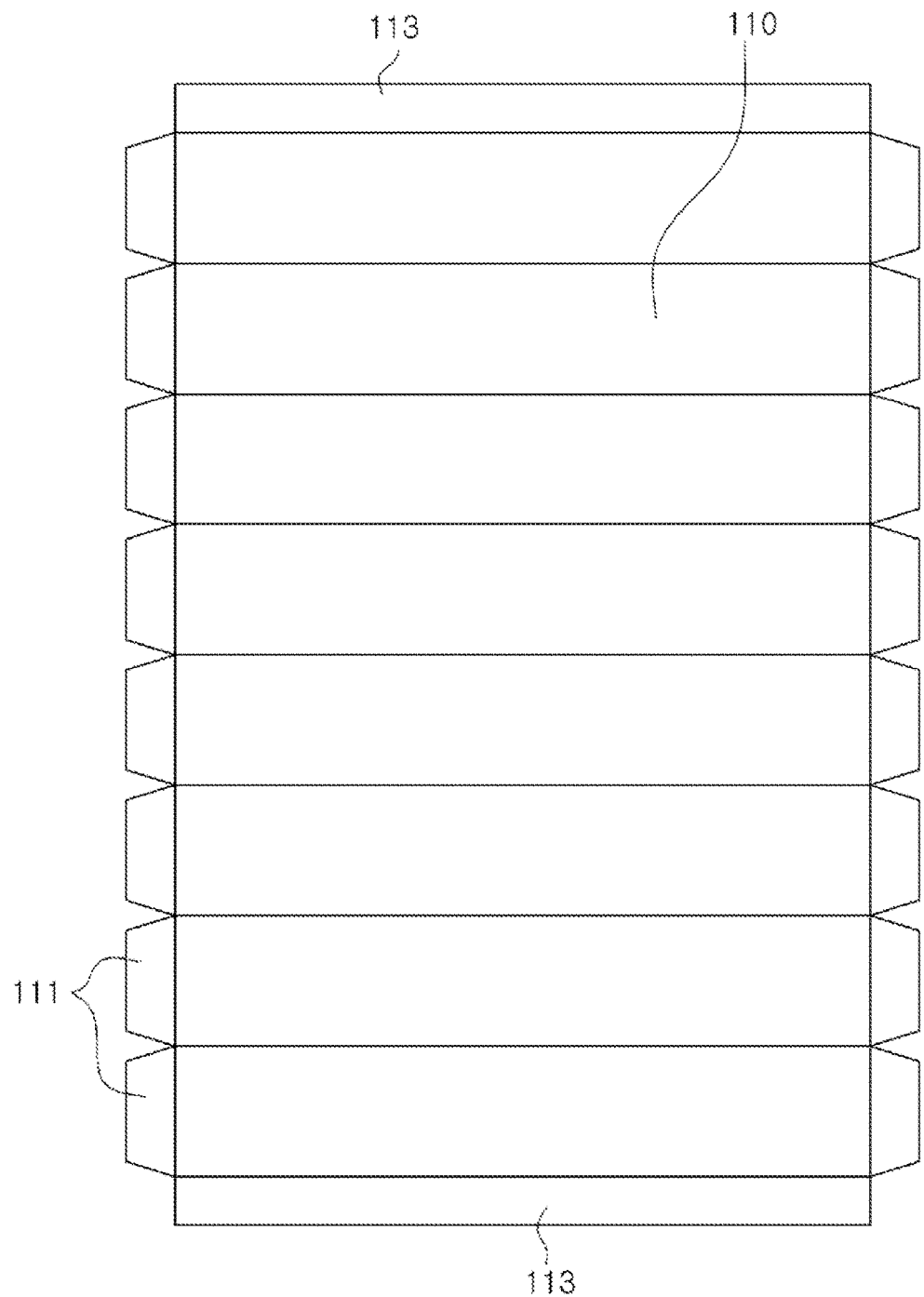

[Fig. 4]
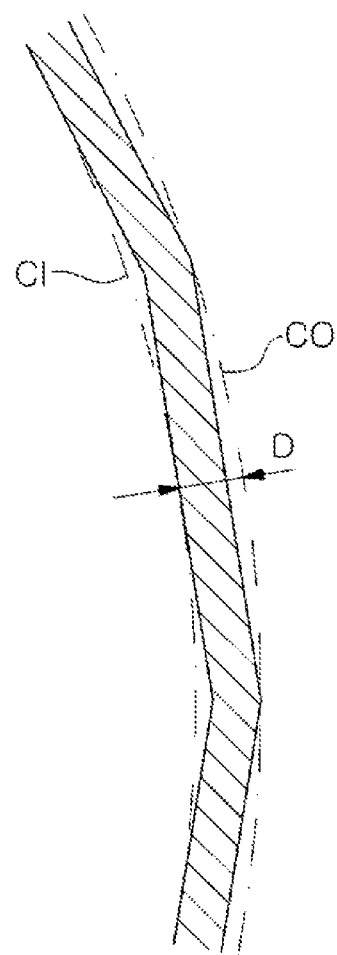

[Fig. 5]
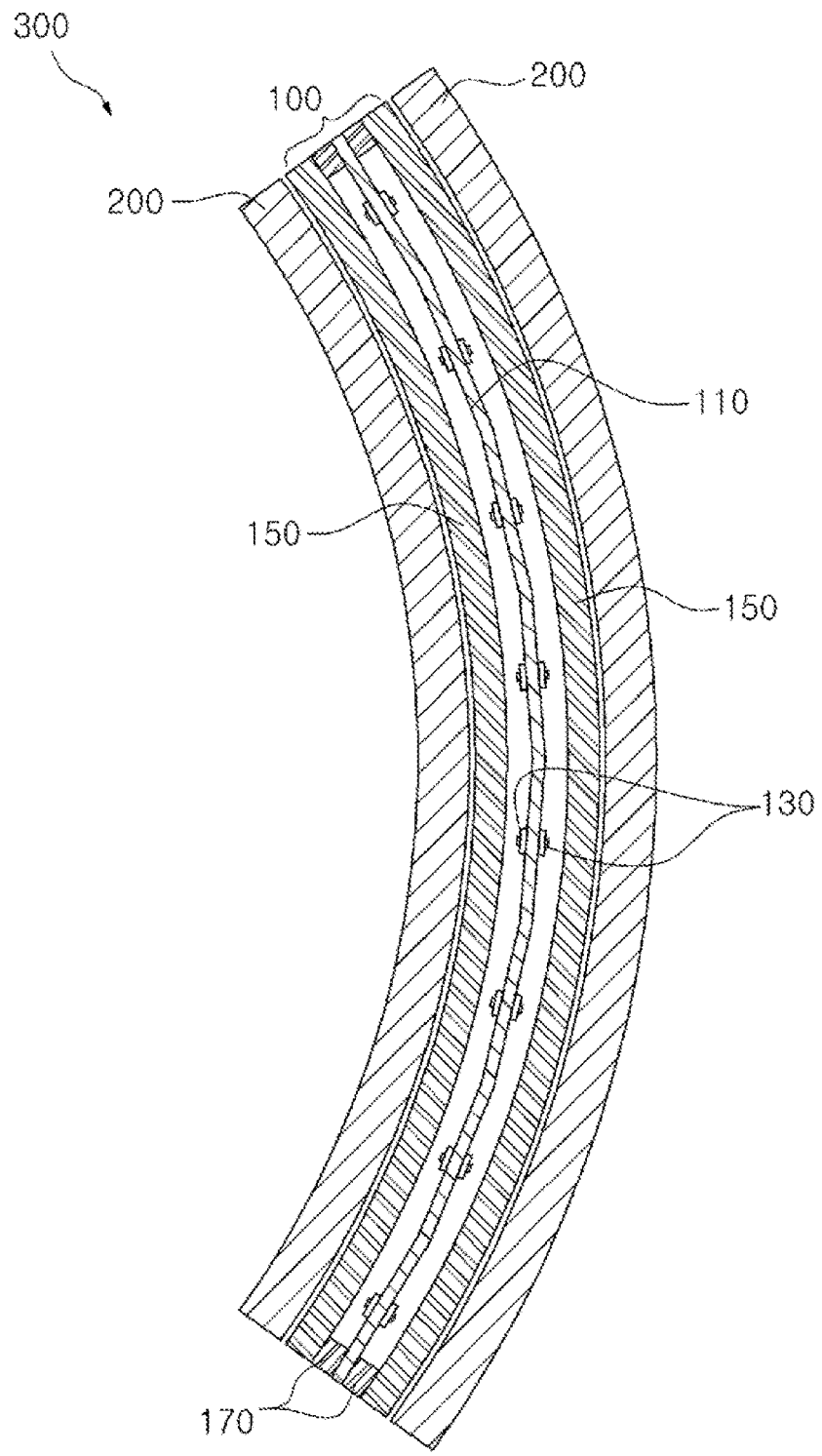

[Fig. 6]
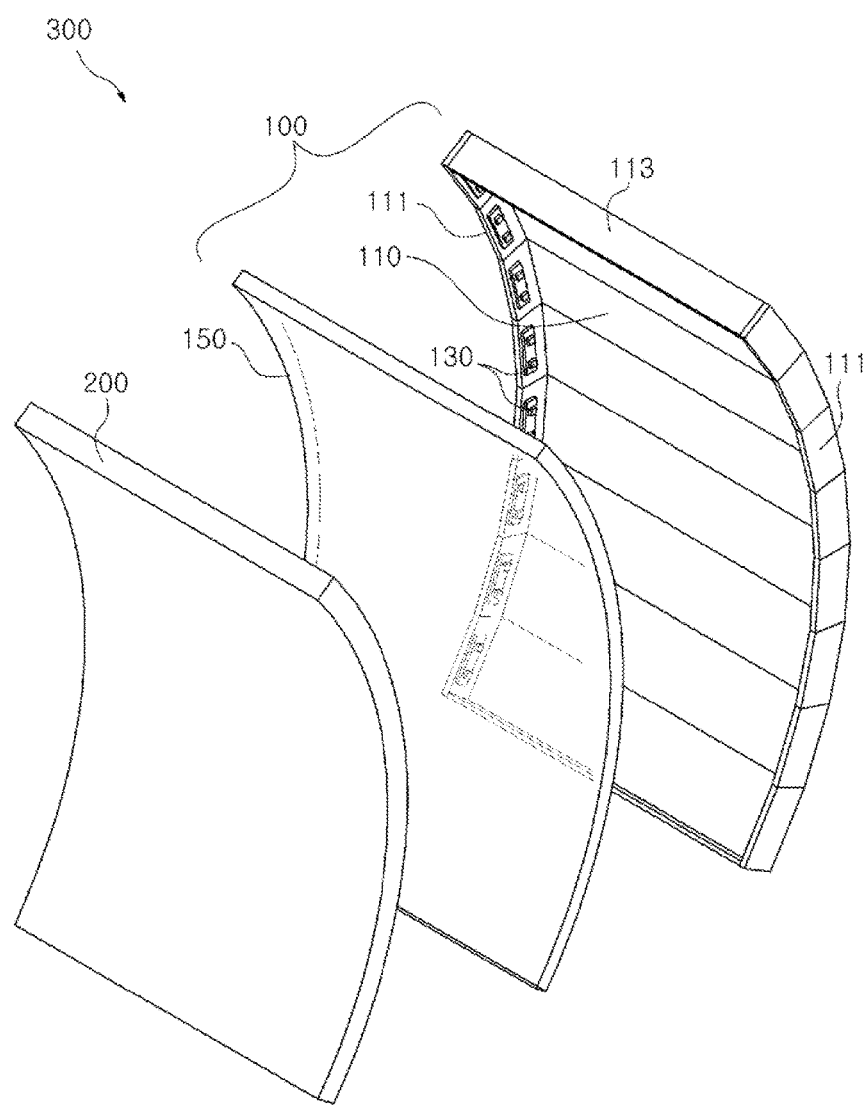

[Fig. 7]
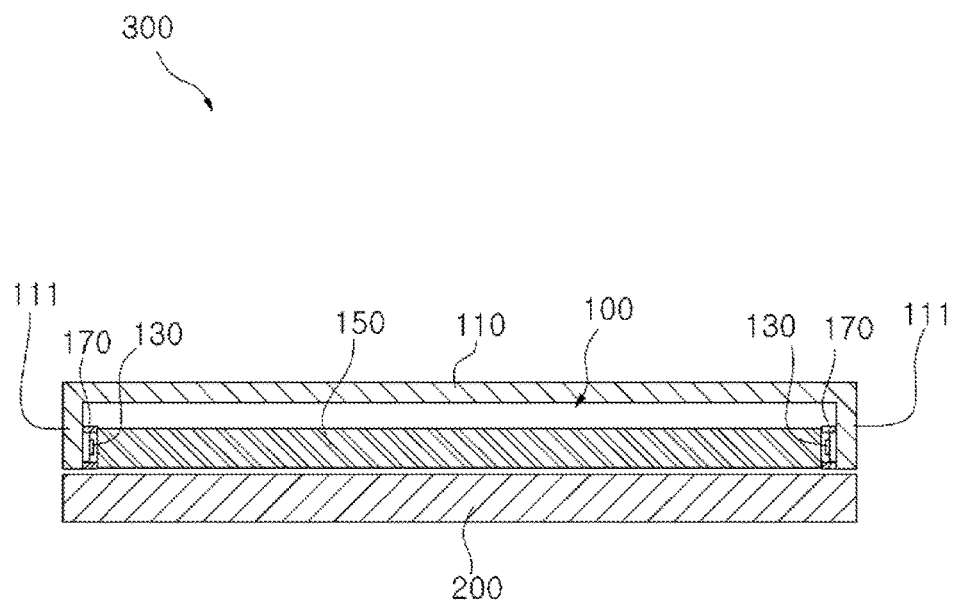

[Fig. 8]
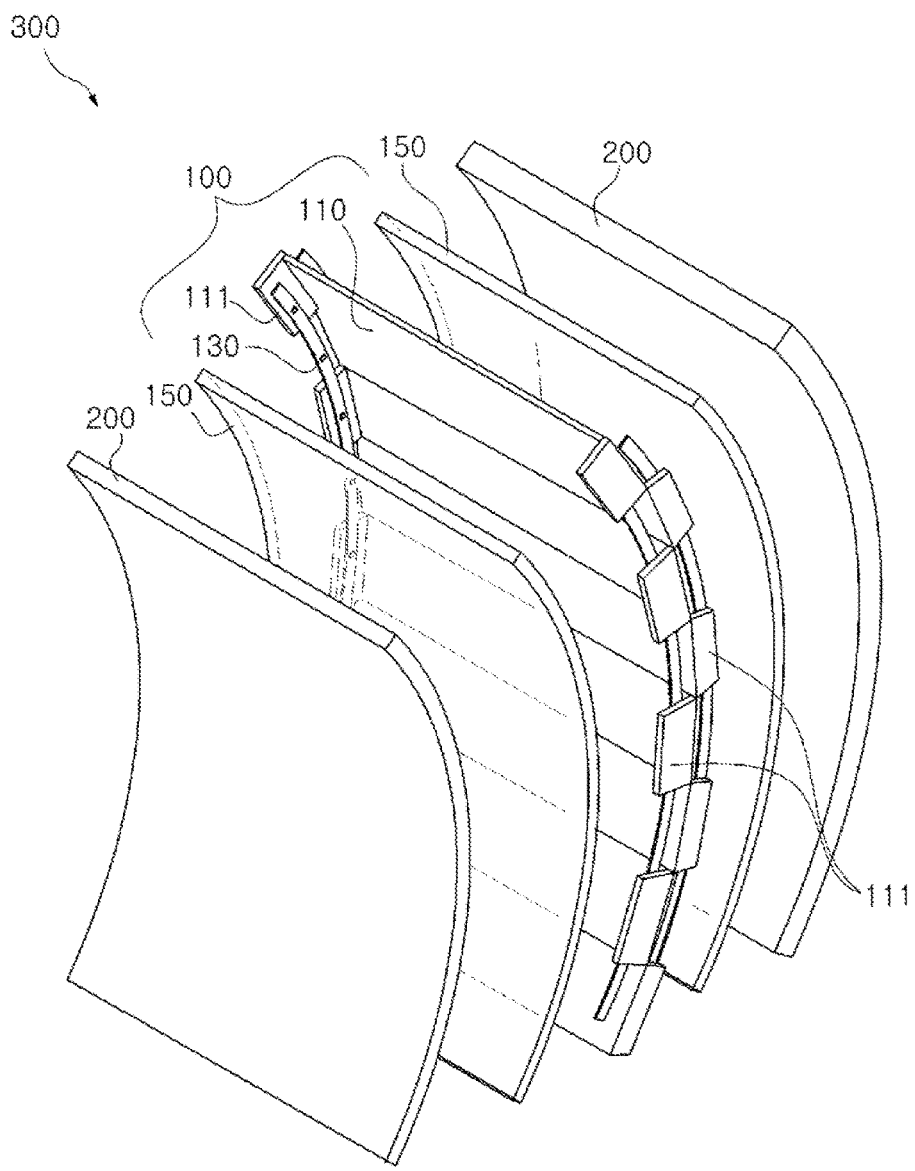

[Fig. 9]
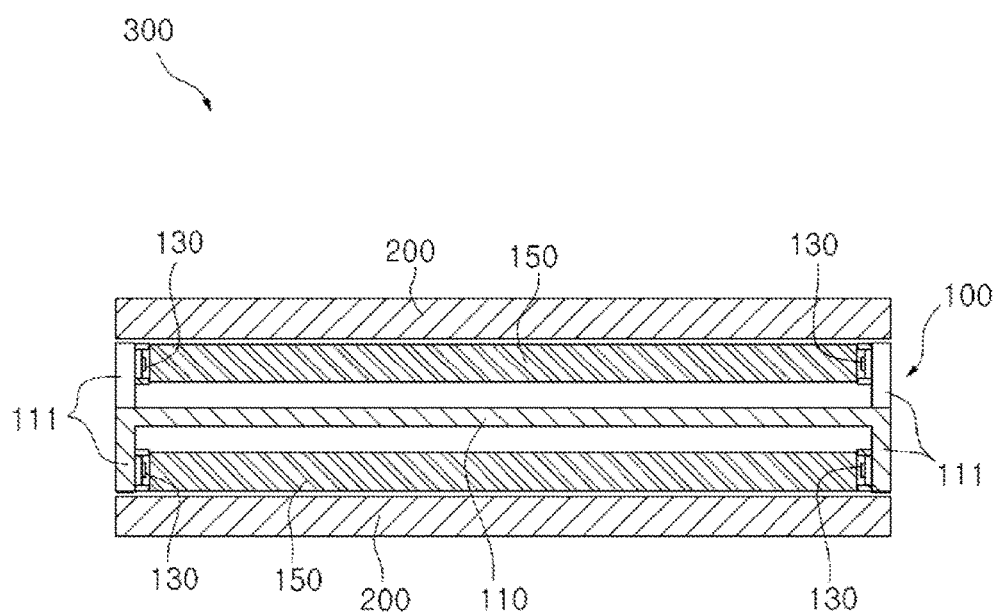

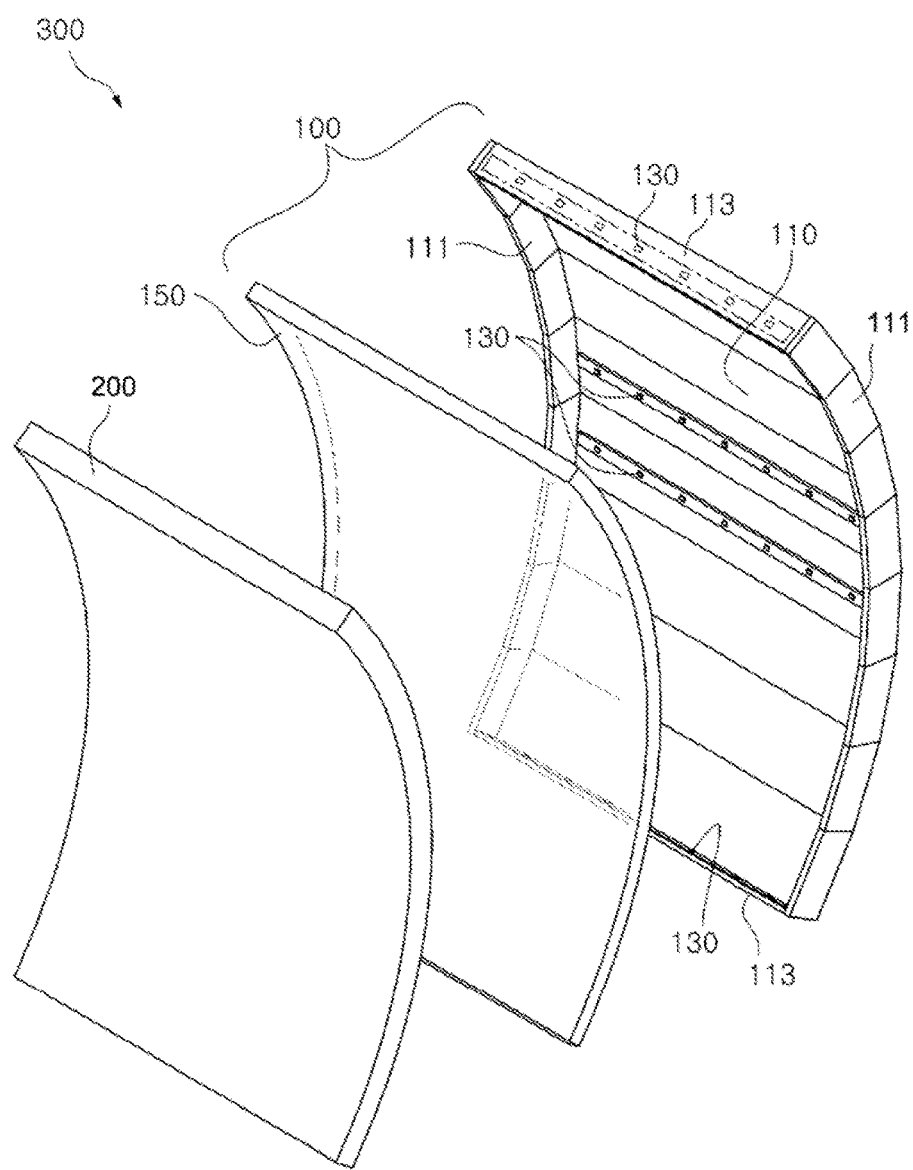
[Fig. 10]

[Fig. 11]
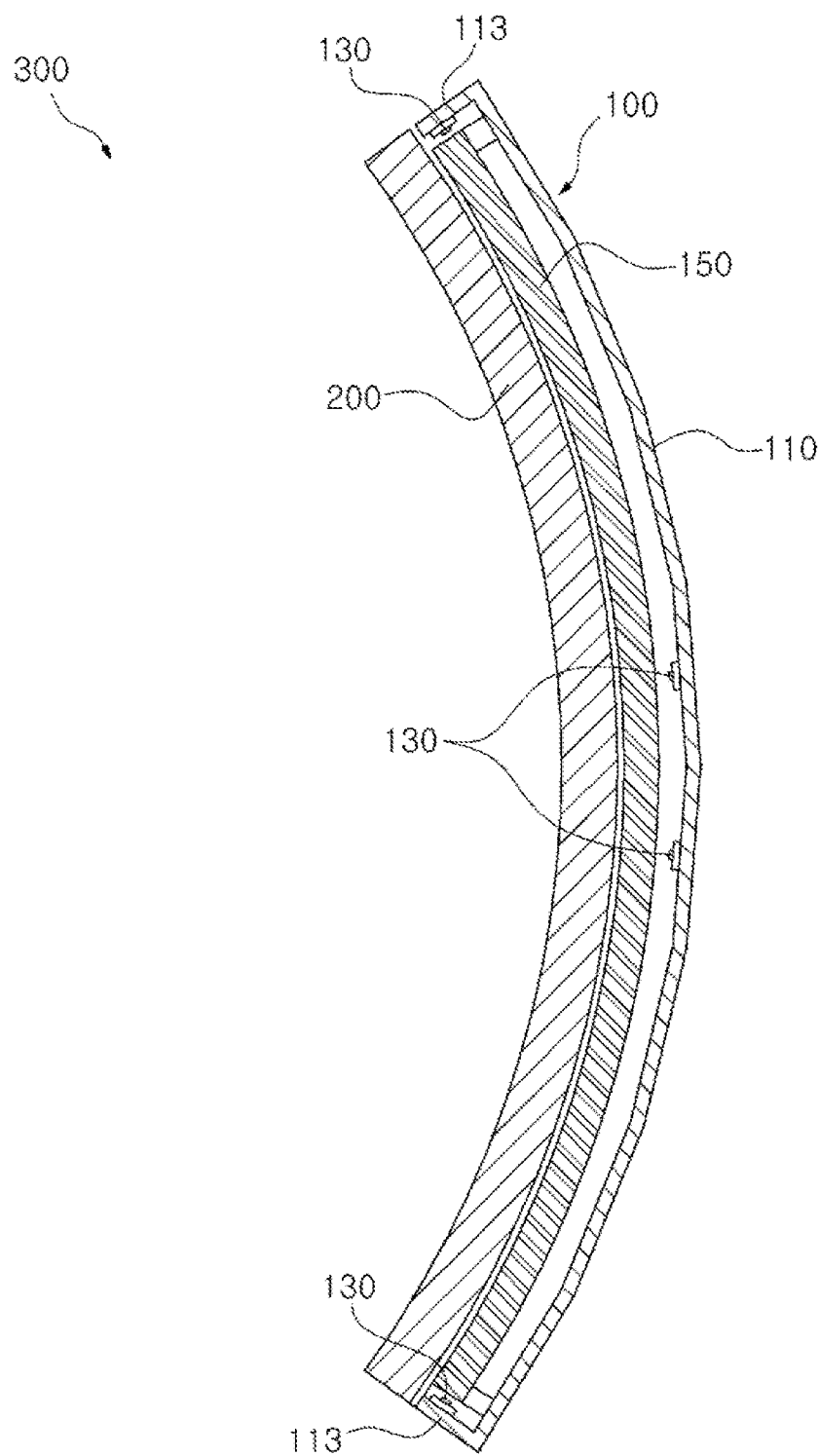

[Fig. 12]
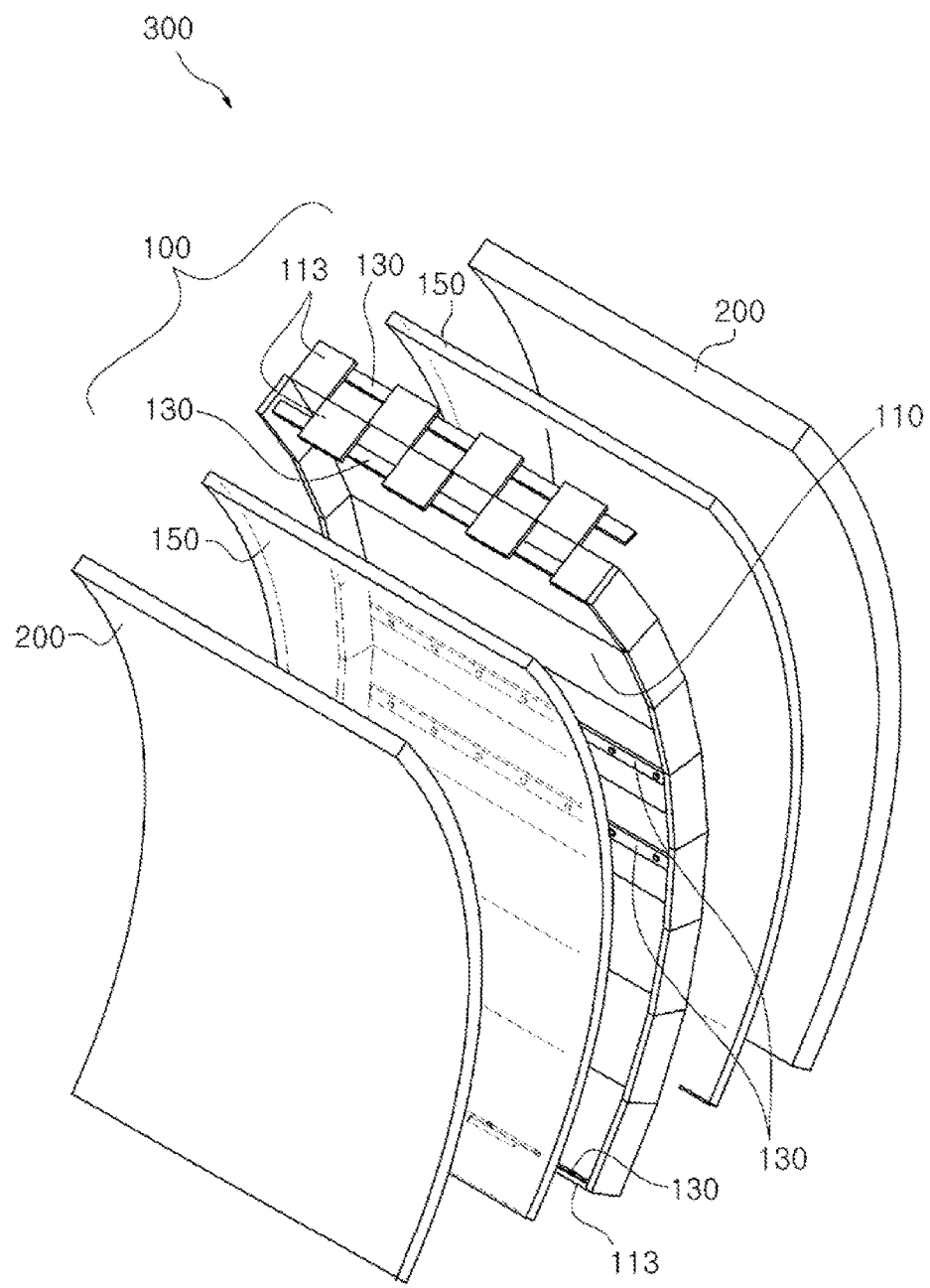

[Fig.13]
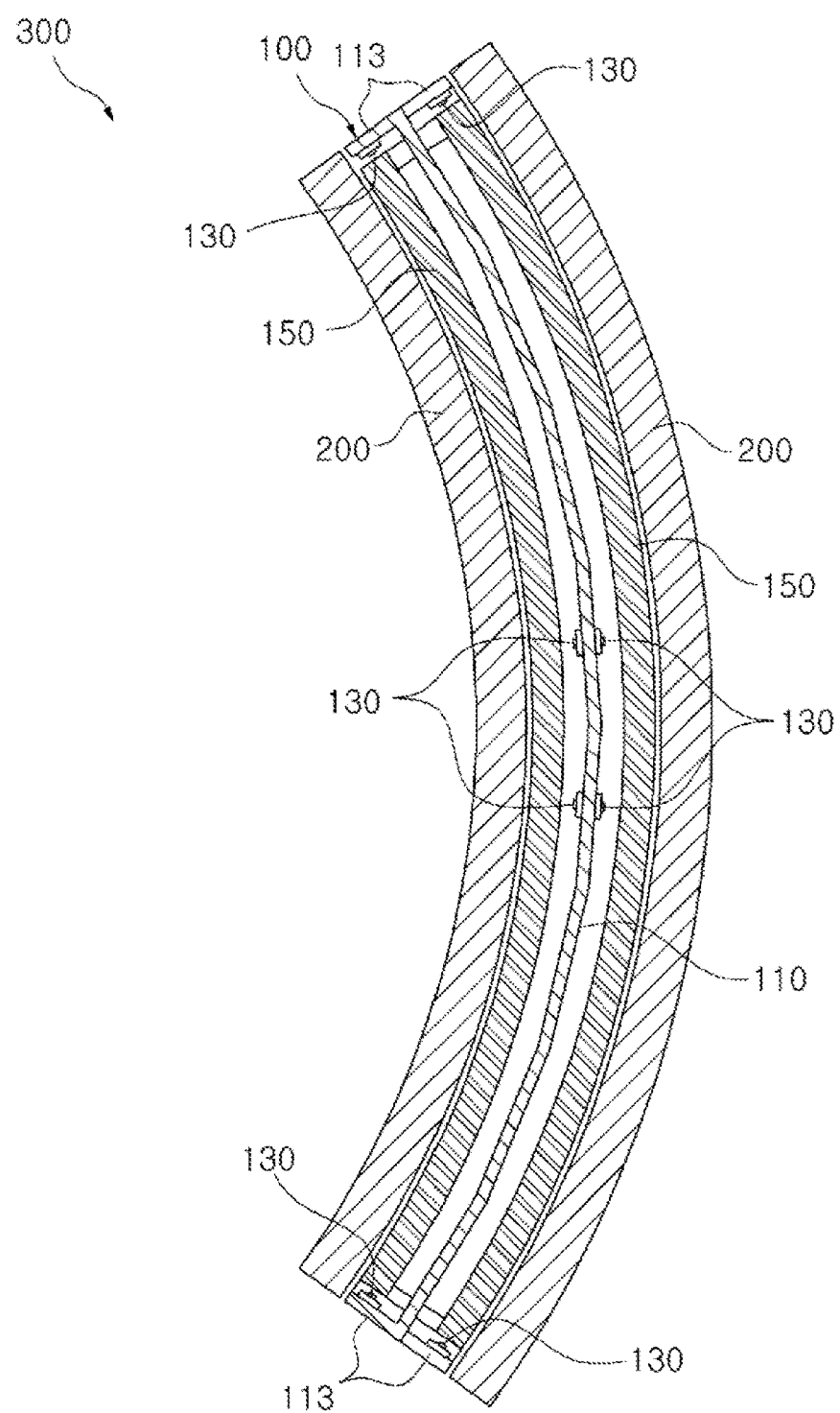

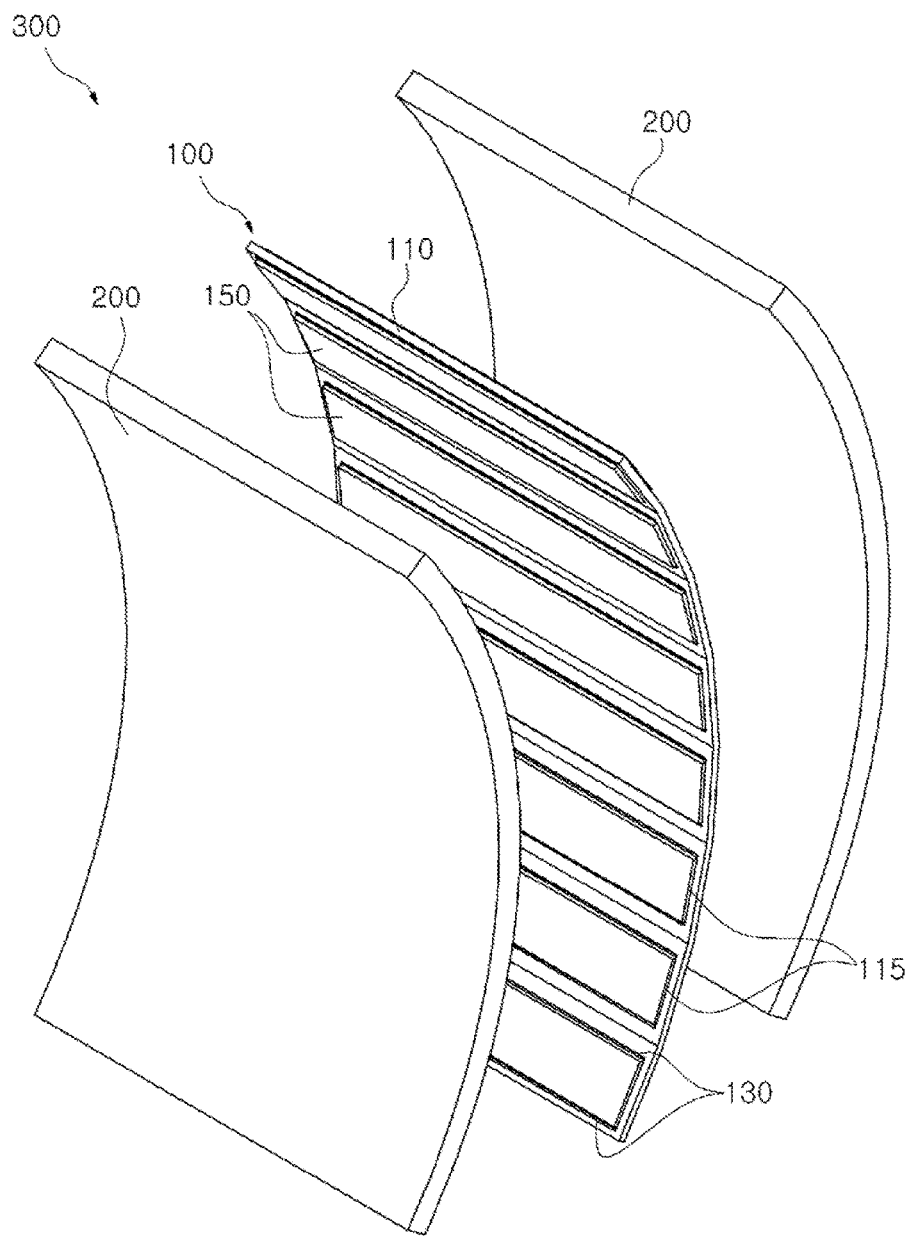
[Fig. 14]

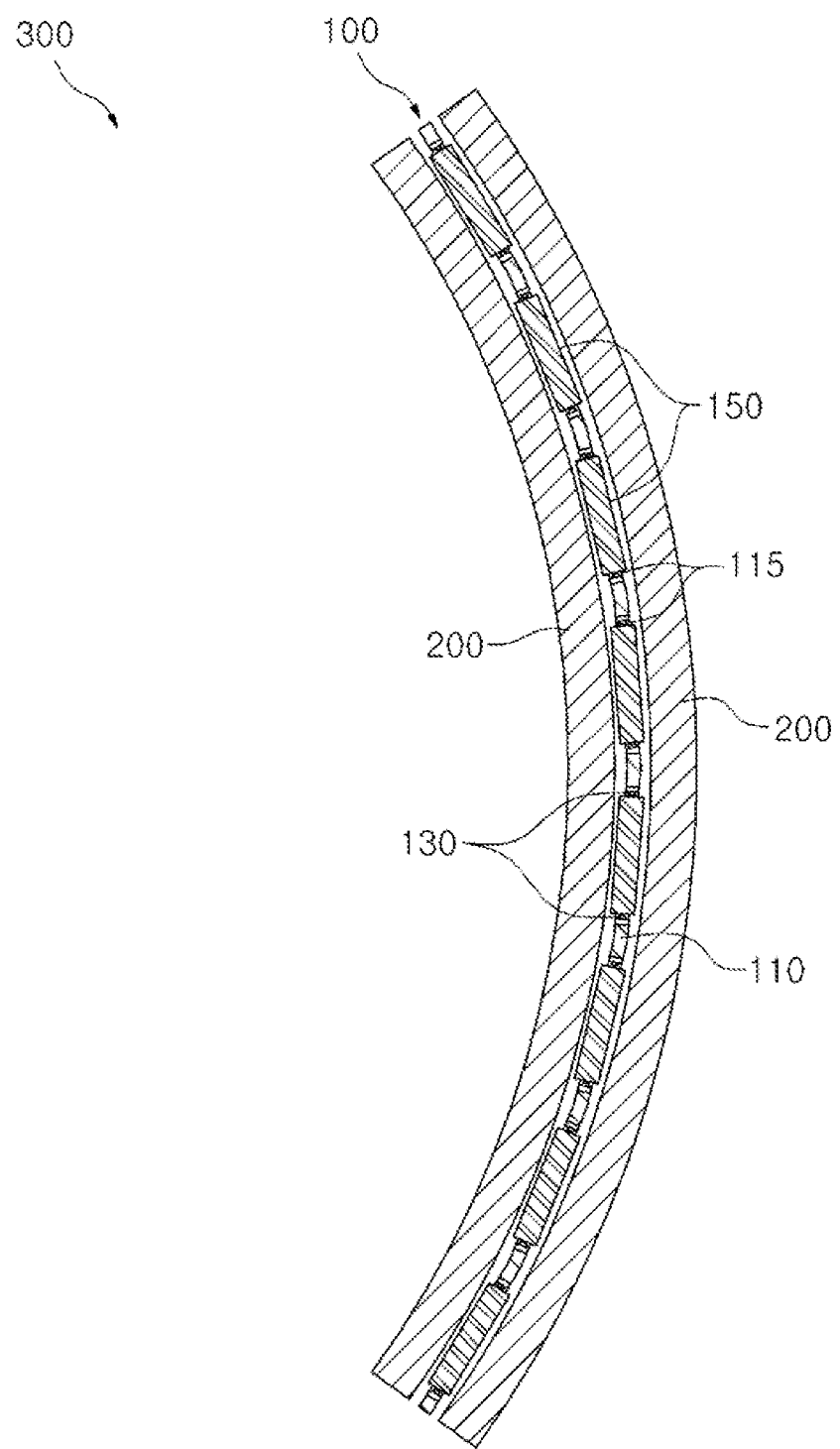
[Fig. 15]

BACKLIGHT UNIT COMPRISING BENT CURVE-SHAPED BACK PLATE, AND CURVED DISPLAY DEVICE USING THE SAME

CROSS REFERENCE TO PRIOR APPLICATIONS

This application is a National Stage Application of PCT International Patent Application No. PCT/KR2014/012608 filed on Dec. 19, 2014, under 35 U.S.C. § 371, which claims priority to Korean Patent Application No. 10-2014-0182364 filed on Dec. 17, 2014, which are all hereby incorporated by reference in their entirety.

TECHNICAL FIELD

The present invention relates to a backlight unit to irradiate a curved display device with light and a curved display device using the same.

BACKGROUND ART

Generally, display devices are devices that display an image and include a display panel to display an image and a backlight unit to emit light to enable viewing of a bright image.

With technical improvement and screen enlargement, in recent years, curved display devices, which employ a curved screen, rather than a flat screen, in order to enlarge a sense of immersion, have been developed.

In such curved display devices, in addition to a curved display panel, a backlight unit is also fabricated into a curved form to uniformly irradiate the curved display panel with light.

Conventional backlight units have been fabricated in such a manner that a back plate is fabricated into a curved from to correspond to a curved display panel and light sources are spaced apart from one another by a constant distance to uniformly irradiate the curved back plate with light.

These conventional backlight units, however, require not only a mold to form the curved back plate, but also precise design for arrangement of light sources to enable uniform light irradiation of the curved back plate, which causes high manufacturing costs of the resulting backlight unit.

In addition, backlight units must be newly fabricated all the time whenever it is necessary to supplement insufficient luminous flux or to provide curved display devices with light sources in various ways.

RELATED ART DOCUMENT (Patent Document 1) Korean Patent Laid-open Publication No. 10-2014-0065577 (published on 30 May 2014)
(Patent Document 2) Korean Patent Laid-open Publication No. 10-2014-0007202 (published on 17 Jan. 2014)
(Patent Document 3) Korean Patent Laid-open Publication No. 10-2011-0025493 (published on 10 Mar. 2011)
(Patent Document 4) Korean Patent Laid-open Publication No. 10-2013-0020302 (published on 27 Feb. 2013)

DISCLOSURE

Technical Problem

Therefore, the present invention has been made in view of the above problems and it is an object of the present invention to provide a backlight unit including a curved back plate, which is capable of eliminating fabrication of a mold required to form the curved back plate and enabling easy design of installation positions of light sources, thereby reducing manufacturing costs and ensuring easy provision of various shapes of backlight units, and a curved display device using the same.

Technical Solution

In accordance with an aspect of the present invention, the above and other objects can be accomplished by the provision of a backlight unit of a curved display device to irradiate a curved display panel with light, the backlight unit including a light source configured to emit light to the display panel, and a back plate including a plurality of planar sections, each having a predetermined width, arranged in a circumferential direction of the display panel on a concentric circle, the center point of which coincides with the center point of a virtual circle defined by the curved display panel, the planar sections of the back plate being bent relative to each other into a curved form such that the light source is installed to the respective bent sections of the bent curved back plate.

The back plate may be bent into a curved form such that a distance between an inscribed circle and a circumscribed circle of the back plate is within a range of 5 mm to 20 mm.

The back plate may include a rim portion perpendicularly protruding from part of or the entire periphery of the back plate to increase rigidity, the light source being installed to the rim portion.

The backlight unit may further include a light diffusion sheet configured to diffuse light emitted from the light source so as to direct the light to the display panel.

The light diffusion sheet may include an optical pattern configured to direct light from the light source located around the light diffusion sheet to a direction in which the display panel is located.

The light diffusion sheet may have a curved form corresponding to the display panel.

The backlight unit may further include a spacer member configured to cause the light diffusion sheet to be spaced apart from the light source and to be secured at a spaced position from the light source.

The back plate may include a spacing and fixing portion formed by bending a portion of the back plate, the spacing and fixing portion being configured to cause the light diffusion sheet to be spaced apart from the light source and to be secured at a spaced position from the light source.

The back plate may include a light source installation opening perforated in a portion thereof, the light source being installed to part of or the entire periphery of the light source installation opening to emit light to both surfaces of the back plate.

The backlight unit may further include a light guide panel provided at both surfaces thereof with optical patterns to cause light of the light source installed to the light source installation opening to be directed to both the surfaces of the back plate.

The light source may include light sources installed respectively to both surfaces of the back plate.

In accordance with another aspect of the present invention, there is provided a curved display device having a bent curved back plate, the curved display device including the backlight unit according to the above-described aspect and a curved display panel installed to any one surface or each of both surfaces of the backlight unit.

Advantageous Effects

According to the present invention, by bending a back plate into a curved form, a mold to form a curved backlight unit is unnecessary, which may reduce manufacturing costs. In addition, by installing light sources to respective bent sections of the back plate, it is possible to achieve easy positioning of the light sources upon design of the light sources.

Further, owing to provision of rim portions, it is possible to achieve easy fabrication of various shapes of backlight units including a vertical type backlight unit, an edge type backlight unit, or a combination thereof, and to provide a backlight unit having increased rigidity and, consequently, improved durability.

Furthermore, it is possible to provide a double-sided curved display device, both display panels of which share a single backlight unit.

DESCRIPTION OF DRAWINGS

FIG. 1 is an exploded perspective view of a display device using a backlight unit that includes a bent curved back plate according to a first embodiment of the present invention.

FIG. 2 is a side sectional view of FIG. 1.

FIG. 3 is a development view of the bent curved back plate included in the backlight unit according to the first embodiment of the present invention.

FIG. 4 is a partial enlarged view schematically showing a bent shape of the back plate shown in FIG. 3.

FIG. 5 is a side sectional view of a display device using a backlight unit that includes a bent curved back plate according to a second embodiment of the present invention.

FIG. 6 is an exploded perspective view of a display device using a backlight unit that includes a bent curved back plate according to a third embodiment of the present invention.

FIG. 7 is a plan sectional view of FIG. 6.

FIG. 8 is an exploded perspective view of a display device using a backlight unit that includes a bent curved back plate according to a fourth embodiment of the present invention.

FIG. 9 is a plan sectional view of FIG. 8.

FIG. 10 is an exploded perspective view of a display device using a backlight unit that includes a bent curved back plate according to a fifth embodiment of the present invention.

FIG. 11 is a side sectional view of FIG. 10.

FIG. 12 is an exploded perspective view of a display device using a backlight unit that includes a bent curved back plate according to a sixth embodiment of the present invention.

FIG. 13 is a side sectional view of FIG. 12.

FIG. 14 is an exploded perspective view of a display device using a backlight unit that includes a bent curved back plate according to a seventh embodiment of the present invention.

FIG. 15 is a side sectional view of FIG. 14.

DESCRIPTION OF REFERENCE NUMERALS

| | |
|---|---|
| 100: backlight unit | 110: back plate |
| 111, 113: rim portion | 115: light source installation hole |
| 130: light source | 150: light diffusion sheet |
| 170: spacer member | 200: display panel |
| 300: display device | |
| R1: bent angle | R2: division angle |
| L: bent width | CL: inscribed circle |
| CO: circumscribed circle | |
| D: distance between the inscribed circle and the circumscribed circle | |

Mode for Invention

Hereinafter, the embodiments of the present invention will be described with reference to the accompanying drawings.

As exemplarily shown in FIGS. 1 to 15, a backlight unit 100, which includes a bent curved back plate according to the embodiments of the present invention, may include a light source 130.

The light source 130 may emit light to allow a viewer to view an image displayed on a display panel 200.

Specifically, the light source 130 may be a light emitting diode (LED) lamp and may be an LED module in which a plurality of LED lamps is arranged and mounted on a circuit board.

In addition, a plurality of light sources 130 may be installed. The light sources 130 may be attached to a back plate 110 by means of an adhesive, or may be attached to the back plate 110 by means of fastening members, such as bolts, rivets, or the like.

Arrangement of the light sources 130 will be described below in detail.

As exemplarily shown in FIGS. 1 to 15, the backlight unit 100, which includes a bent curved back plate according to the embodiments of the present invention, may include the back plate 110.

The back plate 110 may function not only to support the light sources 130, but also to cover the backlight unit 100.

Specifically, the back plate 110 may consist of a plurality of planar sections, each having a predetermined width L, arranged in a circumferential direction of the display panel 200 on a concentric circle, the center point of which coincides with the center point of a virtual circle defined by the curved display panel 200. The planar sections of the back plate may be bent relative to each other such that an angle R1 between the respective neighboring planar sections is within a predetermined range and such that the back plate (hereinafter referred to as the bent curved back plate) is divided into the planar sections at an interval of an arbitrary angle R2 starting from the center point of a virtual circle defined by the curved display panel.

For example, the back plate 110 may be configured into a bent curved form by arranging a plurality of rectangular flat panels in a circumferential direction so as to face the center point of a virtual circle defined by the curved display panel 200.

At this time, while the bent curved form of the back plate 110 may be acquired by bending a single panel into a plurality of rectangular panels, it may also be acquired by connecting distal ends of a plurality of rectangular panels to one another.

Here, in the case in which the respective sections of the back plate 110 bent relative to each other may have different widths L and the curved display panel 200 defines a plurality of virtual circles, the center points of which do not coincide, the back plate 110 may be bent such that the respective neighboring bent sections have different angles R1 on the basis of the respective center points.

While the drawings show that the entire surface of the display panel 200 is concavely curved in the vertical direction about the horizontal axis, the display panel 200 may be convexly curved in the vertical direction about the horizontal axis, or may be concavely or convexly curved in the horizontal direction about the vertical axis.

Providing the back plate 110 with a bent curved form as described above, as exemplarily shown in FIG. 3, allows the back plate to be fabricated by bending. Therefore, fabrication of a mold for use in a forming process is unnecessary, which may result in easy fabrication and reduced manufacturing costs. In addition, installation positions of the light sources 130 may be easily set and the display panel 200 may be irradiated with light in a direction perpendicular thereto, which may result in improved illuminance.

In addition, it is possible to prevent deformation and damage due to external force that may be generated upon fabrication of the bent curved back plate 110.

In addition, as exemplarily shown in FIG. 4, the back plate 110, which has a bent curved form corresponding to the curved display panel 200, may be configured in such a manner that a distance D between an inscribed circle CI and a circumscribed circle CO is within a range of 0.2 mm to 20 mm.

Here, the smaller distance D between the inscribed circle CI and the circumscribed circle CO causes the back plate 110 to be bent a greater number of times. The greater distance D between the inscribed circle CI and the circumscribed circle CO causes the back plate 110 to be bent a smaller number of times. For example, this means that the distance between the inscribed circle CI and the circumscribed circle CO decreases as the number of sides of a polygon increases.

When the distance between the inscribed circle CI and the circumscribed circle CO of the back plate 110 is less than 1 mm, the width L of the bent sections is too small to install the light sources 130. When the distance between the inscribed circle CI and the circumscribed circle CO of the back plate 110 is greater than 20 mm, the width L of the bent sections is too wide to achieve the above-described bending effects.

Meanwhile, to allow the back plate 110 to function as a reflector, a surface of the back plate 110 on which the light sources 130 are arranged may be a reflective surface. To this end, the back plate 110 may be formed of an aluminum or stainless steel plate having high heat radiation and reflectance.

In addition, the light sources 130 may be installed to the back plate 110 so as to be arranged in a line at the center of each of the bent sections of the back plate 110 to construct a vertical type backlight unit. Alternatively, the light sources 130 may be installed to a single bent section of the back plate in a predetermined matrix form.

Here, the number of the bent sections of the back plate 110 may be equal to the number of the light sources 130 to be arranged in a circumferential direction. The light sources 130 may be installed at interfaces between the bent sections, rather than being installed at the bent sections, or may be installed at and between the bent sections.

In addition, the light sources 130 may be installed to both surfaces of the back plate 110 (see FIG. 5).

Rim portions 111 and 113 may be provided such that the light sources 130 are installed to inner surfaces of the rim portions so as to emit light around a light diffusion sheet 150. The rim portions also serve to increase rigidity of the back plate 110.

Specifically, the rim portions 111 and 113 may protrude from part of or the entire periphery of the back plate 110 so as to be perpendicular to the surface of the back plate 110.

For example, part of the periphery of the back plate 110 may include left and right ends of the back plate 110 or upper and lower ends 113 of the back plate 110.

Meanwhile, the rim portions 111 and 113 may be integrally formed at the periphery of the single unfolded back plate 110 and then be bent to be perpendicular to the back plate 110. Alternatively, after bending the back plate 110 into a curved form, the rim portions 111 and 113, which are prefabricated into a form corresponding to the bent curved form of the back plate, may be attached around the periphery of the bent curved back plate 110.

In the embodiment, the rim portions 111 and 113 are located at both sides of the single unfolded back plate 110. More specifically, the rim portions 111 and 113 are located at both side ends of the respective sections of the back plate 110 to be bent relative to each other and then are bent relative to the back plate 110.

In addition, in the case in which the rim portions 111 and 113 are integrally formed with the back plate 110, to allow the rim portions to come into contact with each other without overlapping each other when the back plate 110 is bent into a curved form, both end portions of the rim portions 111 and 113 may be outwardly tapered (see FIG. 3).

For example, considering a plan view of the rim portions 111 and 113 in an unfolded state thereof, the rim portions 111 and 113 may have a trapezoidal shape such that both side ends of the rim portions are gradually outwardly reduced in area.

In addition, once the back plate 110 is bent into a curved form, interfaces between the rim portions 111 and 113 may be welded or fastened to each other by means of fastening members, such as an adhesive, bolts, rivets, or the like, so as not to be separated from each other.

Meanwhile, the light sources 130 may be installed to the rim portions 111 and 113 and/or the bent sections of the back plate 110.

In addition, the back plate 110 may include light source installation openings 115 (see FIGS. 14 and 15).

The light source installation openings 115 may be perforated in the bent sections of the back plate 110 or in interfaces between the bent sections and the light sources 130 may be installed to inner peripheral edges of the respective light source installation openings. As such, the light sources 130 embedded in the back plate 110 may emit light to a front surface and a rear surface of the back plate 110.

In the case in which the back plate 110 includes the light source installation openings 115, the back plate 110 may further include a light guide panel.

The light guide panel may be centrally located in each of the light source installation openings 115 and serve to diffuse light of the light sources 130 installed to the inner peripheral edges of the corresponding light source installation opening 115 to the front surface and the rear surface of the back plate 110.

The light guide panel may extend lengthwise in a longitudinal direction of the bent sections of the back plate 110.

At this time, both surfaces of the light guide panel may be provided with optical patterns to direct light emitted from the light sources 130 to the display panels 200 that are located respectively at both surfaces of the light guide panel.

These optical patterns may differ from each other. In some embodiments, the light guide panel may take the form of the light diffusion sheet 150.

For example, when the light sources are installed respectively to facing inner peripheral edges of the light source installation opening 115, i.e. when the light sources are installed respectively to facing left and right inner peripheral edges of the light source installation opening 115 or at facing upper and lower inner peripheral edges of the light source installation opening 115, the different optical patterns may cause the light source 130 installed at any one inner peripheral edge to emit light toward the display panel 200 having a concavely curved form and the light source 130 installed at the other inner peripheral edge to emit light toward the display panel 200 having a convexly curved form.

Of course, it will be appreciated that the light sources 130 may be installed only to one of upper, lower, left and right inner peripheral edges of the respective light source installation openings 115, rather than being installed to the two facing edges, and that the light sources 130 may be optionally installed to the rim portions 111 and the bent sections of the back plate 110, rather than being installed to the light source installation openings 115.

The backlight unit 100 including the bent curved backlight unit 100 according to the embodiments of the present invention may include the light diffusion sheet 150.

The light diffusion sheet 150 may serve to diffuse light linearly emitted from the light sources 130 to irradiate the display panel 200 in such a manner that the light of the light sources 130 uniformly reaches all over the display panel 200.

On the other hand, to prevent heat generated from the light sources 130 from being transferred to the display panel 200, the light diffusion sheet 150 may be located at a foremost position of the backlight unit 100 where the display panel 200 is located. The light diffusion sheet 150 may have a predetermined thickness to achieve rigidity similar to that of a panel. The light diffusion sheet 150 may be formed into a curved form to correspond to the curved display panel 200.

In addition, in the same manner as the light guide panel, the light diffusion sheet 150 may have an optical pattern to allow light emitted from the light sources 130 located around the light diffusion sheet to be directed to any one surface or both surfaces of the light diffusion sheet 150. That is, the light diffusion sheet 150 may take the form of a light guide panel.

Here, the light diffusion sheet 150 may be formed of a thermosetting or thermoplastic polymer based material, or highly heat-resistant polymer based material, and may be heated to be bent by the weight thereof so as to be formed into a curved form corresponding to the curved display panel.

At this time, the light diffusion sheet 150 may be heated to a temperature that is lower than a polymer glass transition temperature by 10° C. or less and then be bent into a curved form via slow cooling for about 24 hours so as not to be returned into a flat form or distorted as time passes due to additional heating and moisture permeation.

The backlight unit 100 including the bent curved back plate 110 according to the embodiments of the present invention may include spacer members 170 (see FIGS. 5 and 7).

The spacer members 170 may cause the light diffusion sheets 150 to be spaced apart from the back plate 110 so as to be spaced apart from the light sources 130.

Specifically, the spacer members 170 may be interposed between the back plate 110 and the light diffusion sheet 150 at positions on peripheries of the back plate 110 and the light diffusion sheet 150. The spacer members 170 may have a shape corresponding to the periphery of the light diffusion sheet 150. When the spacer members 170 are installed to the rim portions 111 of the back plate 110, the spacer members 170 may be shaped to follow the bent curved form of the rim portions 111.

In addition, the spacer member may be replaced with a spacing and fixing portion (not shown) that is formed by inwardly bending a portion of the respective rim portions 111 and 113, and the light diffusion sheet 150 may be seated on the spacing and fixing portion to cause the light diffusion sheet 150 to be spaced apart from the light sources 130.

Hereinafter, various embodiments in which the backlight unit 100 including the bent curved back plate according to the above-described embodiments of the present invention is applied to a curved display device 300 that uses a backlight unit including a bent curved back plate according to the embodiments of the present invention will be described.

First, the curved display device 300, which uses the backlight unit including the bent curved back plate according to the embodiments of the present invention, may include the display panel 200.

The display panel 200 serves to display an image, and may include a first substrate, a second substrate, and a liquid crystal layer located between the first substrate and the second substrate.

Here, when any one of the first substrate and the second substrate is a color filter substrate, the other substrate may be a thin film transistor substrate, and the liquid crystal layer may include polymers arranged in the vertical direction or in the horizontal direction.

The color filter substrate may be a stack of a plurality of filters overlapping each other, and the first substrate and the second substrate may be sealed with each other using a sealant to prevent leakage of the liquid crystal layer.

Meanwhile, the display panel 200 may include a drive circuit board to drive the display panel 200.

In addition, the display panel 200 may have a bent curved form. The display panel 200 may be formed by bending a thin etched panel into a curved form by means of a curved form maintenance member, e.g., a curved transparent panel or a curved centrally perforated rim frame, or may be formed by securely inserting the flexible display panel 200 into a curved case of the display device 300.

The display panel 200 may be disposed at the front of the backlight unit 100 such that an image display surface thereof is directed outward. In the case of a double-sided curved display device 300, two display panels may be disposed respectively at front and rear sides of the backlight unit 100 with the backlight unit 100 interposed therebetween.

At this time, in the case of the double-sided curved display device 300, when the display panel 200 located at one side of the backlight unit 100 has a concave image display surface, the other display panel 200 may have a convex image display surface.

First Embodiment

As exemplarily shown in FIGS. 1 and 2, the curved display device 300, which uses the backlight unit including the bent curved back plate according to the first embodiment, includes the display panel 200 having a curved image display surface and the backlight unit 100 installed at the rear of the display panel 200.

The backlight unit 100 has the most basic form in which the light sources 130 are installed to the respective bent sections of the curved back plate.

At this time, the back plate 110 may be optionally provided with the rim portions 111 and 113 or may have no rim portions, and the light sources 130 may be installed at interfaces between the bent sections of the back plate 110, rather than being installed at the bent sections.

In addition, the light diffusion sheet 150 may be optionally disposed at the front of the light sources 130 to forwardly diffuse light emitted from the light sources 130 toward the display panel 200. In the case in which the light diffusion sheet 150 is installed and the rim portions 111 and 113 are not formed, the spacer member 170 may be installed at the periphery of the back plate 110 to cause the light diffusion sheet 150 to be spaced apart from the light sources 130.

At this time, instead of the spacer member 170, a spacing and fixing portion formed by bending a peripheral portion of the back plate 110 may be provided to cause the light diffusion sheet 150 to be spaced apart from the light sources 130.

The curved display device 300 having the above-described configuration, which uses the backlight unit including the bent curved back plate according to the first embodiment, may allow light emitted from the light sources 130 to be uniformly diffused through the light diffusion sheet 150, thereby assisting a viewer in viewing an image displayed on the display panel 200.

Accordingly, when installing the light sources 130 to respective sections of the back plate to be bent, the light sources 130 may be spaced apart from one another by a constant distance on the curved display panel, which enables easy setting of installation positions of the light sources 130 upon fabrication of the curved display device 300.

Second Embodiment

As exemplarily shown in FIG. 5, the curved display device 300, which uses the backlight unit including the bent curved back plate according to the second embodiment, may have substantially the same configuration as that of the first embodiment except for the light sources 130 that are installed to both surfaces of the back plate 110, rather than being installed to one surface of the back plate.

In the second embodiment, the light sources 130 are installed to both surfaces of the bent sections of the back plate 110, and the light diffusion sheets 150 are respectively disposed at both surfaces of the back plate 110.

In addition, the display panel 200 having a concavely curved surface is located at a front surface of the back plate 110 and the display panel 200 having a convexly curved surface is located at a rear surface of the back plate 110, such that light is emitted from both the surfaces of the back plate 110 to the respective display panels 200, which enables fabrication of the double-sided curved display device 300.

The double-sided curved display device 300 as described above may display different images on both surfaces thereof in such manner that the display panel 200 located at any one side thereof allows a viewer to play a game and the display panel 200 located at the other side thereof shows an advertisement screen.

Accordingly, the curved display device 300 according to the second embodiment may be the double-sided curved display device 300, both display panels of which share a single backlight unit 100.

Third Embodiment

As exemplarily shown in FIGS. 6 and 7, the curved display device 300, which uses the backlight unit including the bent curved back plate according to the third embodiment, further includes the rim portions 111 formed at the back plate 110 as compared to the back plate 110 of the first embodiment.

The backlight unit 100 including the bent curved back plate 110 according to the third embodiment is configured in such a manner that the light sources 130 are installed respectively to the rim portions 111 located at both sides of the back plate 110 and the periphery of the light diffusion sheet 150 or light guide panel is located on the light sources 130.

Here, in the case of installing the light diffusion sheet 150, the light diffusion sheet 150 may be provided at an outer surface thereof with an optical pattern to diffuse light emitted from the light sources 130, which are located on the periphery of the light diffusion sheet, to the entire surface of the light diffusion sheet, in the same manner as the light guide panel.

In addition, the spacer member 170 may be installed between the light diffusion sheet 150 or the light guide panel and the light sources 130 to cause the light sources 130 to be spaced apart from the light diffusion sheet 150. At this time, instead of the spacer member 170, a spacing and fixing portion (not shown) may be formed by bending the back plate 110 such that the light diffusion sheet 150 or the light guide panel is installed to the spacing and fixing portion.

Meanwhile, the light sources 130 may be prefabricated into a form corresponding to a shape of the rim portions 111 of the bent back plate 110 and then be attached to the rim portions 111. As the light sources 130 are attached respectively to the rim portions 111 of the respective bent sections of the back plate 110, the light sources may naturally be installed on a curved path when the back plate 110 is bent into a curved form.

At this time, the rim portions 111 may be formed respectively at both bent curved portions of the back plate 110.

In addition, in the same manner as the first embodiment, the display panel 200 may be located at the front of the light diffusion sheet 150 or the light guide panel.

The curved display device 300 having the above-described configuration, which uses the backlight unit including the bent curved back plate according to the third embodiment, causes light emitted around the light diffusion sheet 150 or the light guide panel to be changed in a diffusion path through the light diffusion sheet 150 or the light guide panel so as to be directed to the display panel 200, which may assist a viewer in viewing an image.

Accordingly, the curved display device 300 may be fabricated by easily setting installation positions of the light sources 130 with respect to the curved display panel 200.

Fourth Embodiment

As exemplarily shown in FIGS. 8 and 9, the curved display device 300, which uses the backlight unit including the bent curved back plate according to the fourth embodiment, may have substantially the same configuration as that of the third embodiment except for the light sources 130 that are installed to both surfaces of the back plate 110.

More specifically, the backlight unit 100 including the bent curved back plate 110 according to the fourth embodiment has the rim portions 111 perpendicularly protruding from both surfaces, i.e. front and rear surfaces of the back plate 110, and the light sources 130 are respectively installed to the rim portions 111 protruding in opposite directions.

That is, to allow the light sources 130 installed to the rim portions 111 to emit light from both surfaces of the back plate 110, the rim portions 111 may be bent perpendicular to the front and rear surfaces of the back plate 110.

At this time, the rim portions 111 of the back plate 110 are alternately bent. For example, one rim portion is bent perpendicular to the front surface of the back plate 110 and another neighboring rim portion is bent perpendicular to the rear surface of the back plate 110, such that the light sources 130 are installed to the rim portions 111 located at both surfaces of the back plate 110.

In addition, the light diffusion sheets 150 or the light guide panels may be disposed on both surfaces of the back plate 110 to diffuse light from the light sources 130 installed to the rim portions 111. The display panel 200 having a concavely curved form and the display panel 200 having a convexly curved form may be installed at outer sides of the light guide panels to allow a viewer to view images displayed in opposite directions.

The curved display device 300 having the above-described configuration, which uses the backlight unit including the bent curved back plate according to the fourth embodiment, may be a double-sided curved display device 300, both display panels of which share a single backlight unit 100.

Fifth Embodiment

As exemplarily shown in FIGS. 10 and 11, the curved display device 300, which uses the backlight unit including the bent curved back plate according to the fifth embodiment, may have substantially the same configuration as that of the third embodiment except for installation positions of the light sources 130.

In the fifth embodiment, the light sources 130 are installed to the rim portions 113 located at both ends of the back plate 110, rather than being installed to the rim portions 111 bent from the back plate 110 as in the third embodiment.

That is, in the fifth embodiment, to emit light from a straight edge of the light diffusion sheet 150 or the light guide panel, rather than a curved edge of the light diffusion sheet or the light guide panel, the rim portion 113 is formed at a position corresponding to the straight edge and the light sources 130 are installed to the rim portion.

Here, when installing the light sources 130 to the straight edge of the light diffusion sheet 150 or the light guide panel, light emitted from the light sources 130 is collimated, causing greater leakage of light at a central portion of the curved display device.

Therefore, the central portion of the curved display device 300 has less luminous flux than both side portions of the curved display device 300 where the light sources 130 are located.

To compensate for this problem, in the fifth embodiment, the light sources 130 may be installed to the central portion of the back plate 110 as well as the straight rim portions 113, in order to supplement insufficient luminous flux.

The curved display device 300 having the above-described configuration, which uses the backlight unit including the bent curved back plate according to the fifth embodiment, may be fabricated by easily setting installation positions of the light sources 130.

Sixth Embodiment

As exemplarily shown in FIGS. 12 and 13, the curved display device 300, which uses the backlight unit including the bent curved back plate according to the sixth embodiment, may have substantially the same configuration as that of the fifth embodiment except for the light sources 130 that are installed to both surfaces of the back plate 110.

The backlight unit 100 including the bent curved back plate 110 according to the sixth embodiment is configured in such a manner that the rim portions 113 of the back plate 110 perpendicularly protrude from front and rear surfaces of the back plate 110.

That is, in the bent curved back plate 110 of the sixth embodiment, instead of installing the light sources to the rim portions 111 located at both sides of the bent sections of the back plate 110, the rim portions 113 formed at both ends of the back plate 110 as in the fifth embodiment are provided to perpendicularly protrude from front and rear surfaces of the back plate 110 such that the light sources 130 are installed to the respective rim portions 113.

At this time, the rim portions 113 take the form of a plurality of divided portions that is alternately arranged in such a manner that any one rim portion is bent to the front surface and another neighboring rim portion is bent to the rear surface of the back plate.

In addition, to diffuse light of the light sources 130 installed to the rim portions 113 protruding from the front and rear surfaces of the back plate 110 so as to irradiate the display panel 200 with the light, the light diffusion sheets 150 or the light guide panels may be disposed respectively on the front and rear surfaces of the back plate 110.

Even in this case, of course, to supplement insufficient luminous flux as in the fifth embodiment, the light sources 130 may be additionally installed to a central portion of the front surface and a central portion of the rear surface of the back plate 110.

In addition, the display panel 200 having a concavely curved form and the display panel having a convexly curved form may be disposed respectively at outer sides of the light diffusion sheets 150 or the light guide panels that are disposed on the front and rear surfaces of the back plate 110, to allow a viewer to view images in opposite directions.

The curved display device 300 having the above-described configuration, which uses the backlight unit including the bent curved back plate according to the sixth embodiment, may be a double-sided curved display device 300, both display panels of which share a single backlight unit 100.

Seventh Embodiment

As exemplarily shown in FIGS. 14 and 15, the curved display device 300, which uses the backlight unit including the bent curved back plate according to the seventh embodiment, includes the light source installation openings 115 perforated in the back plate 110 of the backlight unit 100.

The backlight unit 100 of the seventh embodiment includes the light source installation openings 115 which are centrally formed in the respective bent sections of the back plate 110 to extend lengthwise in a longitudinal direction, and the light sources 130 are installed to facing inner peripheral edges of the respective light source installation openings 115 so as to emit light to both surfaces of the back plate.

Here, while the drawings show that the light sources 130 are installed to facing upper and lower inner peripheral edges of the respective light source installation openings, it will be appreciated that the light sources may be installed to left and right inner peripheral edges of the respective light source installation openings.

In addition, the light diffusion sheet 150 or the light guide panel is installed between the respective neighboring light sources 130. At this time, the light diffusion sheet 150 or the light guide panel may be provided at both surfaces thereof with different optical patterns to guide light vertically or horizontally introduced into the light guide panel to both surfaces thereof.

The backlight unit 100 having the above-described configuration according to the seventh embodiment causes light emitted from the light sources 130 to be simultaneously directed to front and rear surfaces of the back plate 110 through the light diffusion sheets 150 or the light guide panels.

Meanwhile, the concavely curved display panel 200 and the convexly curved display panel 200 may be disposed on the front and rear surfaces of the backlight unit 100 to enable fabrication of the double-sided curved display device 300.

At this time, the light diffusion sheets or light guide panels fitted in the respective light source installation openings 115 may be configured to cover the entire back plate 110 to achieve improved uniform diffusion of light so as to more uniformly irradiate the display panel 200 with light diffused by the light diffusion sheets or light guide panels.

Accordingly, the curved display device 300 of the seventh embodiment enables easy fabrication of the double-sided curved display device 300, both display panels of which share a single backlight unit 100, owing to easy setting of installation positions of the light sources 130.

The backlight unit 100 including the bent curved back plate 100 according to the embodiments of the present invention may eliminate fabrication of a mold required to form the curved back plate 100 and enable easy setting of installation positions of the light sources 130 upon design of the light sources, which may result in considerably reduced manufacturing costs.

In addition, installing the light sources to surfaces of the back plate 110 enables fabrication of a vertical type backlight unit 100 and additionally providing the back plate 110 with the rim portions 111 and 113 may increase rigidity of the back plate 110 and enable fabrication of an edge type backlight unit 100. Moreover, the backlight unit 100, which may employ both vertical type and edge type backlight units as needed, may be easily fabricated.

In addition, the double-sided curved display device 300, both display panels of which share a single backlight unit 100, may be easily fabricated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

The present invention is applicable to industry fields using game machines, TVs, billboards, and the like that use display devices.

The invention claimed is:

1. A backlight unit of a curved display device to irradiate a curved display panel with light, the backlight unit comprising:
    a light source configured to emit light to the display panel;
    a back plate including a plurality of planar sections, each having a predetermined width, arranged in a circumferential direction of the display panel on a concentric circle, the center point of which coincides with the center point of a virtual circle defined by the curved display panel, the planar sections of the back plate being bent relative to each other into a curved form such that the light source is installed to the respective bent sections of the bent curved back plate; and
    a light diffusion sheet,
    wherein the back plate includes a spacing and fixing portion formed by bending a peripheral portion of the back plate, the spacing and fixing portion being configured to cause the light diffusion sheet to be spaced apart from the light source and to be secured at a spaced position from the light source.

2. The backlight unit according to claim 1, wherein the back plate is bent into a curved form such that a distance between an inscribed circle and a circumscribed circle of the back plate is within a range of 5 mm to 20 mm.

3. The backlight unit according to claim 1, wherein the back plate includes a rim portion perpendicularly protruding from part of or the entire periphery of the back plate to increase rigidity, the light source being installed to the rim portion.

4. The backlight unit according to claim 1, wherein the light diffusion sheet is configured to diffuse light emitted from the light source so as to direct the light to the display panel.

5. The backlight unit according to claim 4, wherein the light diffusion sheet includes an optical pattern configured to direct light from the light source located around the light diffusion sheet to a direction in which the display panel is located.

6. The backlight unit according to claim 4, wherein the light diffusion sheet has a curved form corresponding to the display panel.

7. The backlight unit according to claim 4, further comprising a spacer member configured to cause the light diffusion sheet to be spaced apart from the light source and to be secured at a spaced position from the light source.

8. The backlight unit according to claim 1, wherein the back plate includes a light source installation opening perforated in a portion thereof, the light source being installed to part of or the entire periphery of the light source installation opening to emit light to both surfaces of the back plate.

9. The backlight unit according to claim 8, wherein the light diffusion sheet is provided at both surfaces thereof with optical patterns to cause light of the light source installed to the light source installation opening to be directed to both the surfaces of the back plate.

10. The backlight unit according to claim 1, wherein the light source includes light sources installed respectively to both surfaces of the back plate.

11. A curved display device having a bent curved back plate, the curved display device comprising:
    the backlight unit according to claim 1; and
    a curved display panel installed to any one surface or each of both surfaces of the backlight unit.

* * * * *